(12) United States Patent  
Moon et al.

(10) Patent No.: US 8,769,559 B2  
(45) Date of Patent: Jul. 1, 2014

(54) SYSTEMS AND METHODS FOR USING INCENTIVES TO INCREASE ADVERTISING EFFECTIVENESS

(75) Inventors: Hannah Y Moon, Boston, MA (US); D. Beau Morley, Somerville, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 97 days.

(21) Appl. No.: 11/694,900

(22) Filed: Mar. 30, 2007

(65) Prior Publication Data

US 2008/0244666 A1    Oct. 2, 2008

(51) Int. Cl.
*H04N 7/16* (2011.01)
*H04N 7/10* (2006.01)
*H04N 7/025* (2006.01)

(52) U.S. Cl.
USPC ............ 725/23; 725/10; 725/34; 725/35; 725/36

(58) Field of Classification Search
USPC ............................................. 725/23
See application file for complete search history.

(56) References Cited

U.S. PATENT DOCUMENTS

| | | | |
|---|---|---|---|
| 8,112,310 B1* | 2/2012 | Yehoshua et al. | 705/14.42 |
| 2002/0032906 A1* | 3/2002 | Grossman | 725/42 |
| 2003/0172376 A1* | 9/2003 | Coffin, III | 725/22 |
| 2004/0133909 A1* | 7/2004 | Ma | 725/34 |
| 2004/0226034 A1* | 11/2004 | Kaczowka et al. | 725/9 |
| 2005/0091686 A1* | 4/2005 | Sezan et al. | 725/46 |
| 2005/0097594 A1* | 5/2005 | O'Donnell et al. | 725/15 |
| 2006/0080717 A1* | 4/2006 | Barzilay et al. | 725/100 |
| 2007/0079326 A1* | 4/2007 | Datta et al. | 725/34 |
| 2007/0124769 A1* | 5/2007 | Casey et al. | 725/46 |
| 2007/0192784 A1* | 8/2007 | Postrel | 725/23 |
| 2008/0115161 A1* | 5/2008 | Kurzion | 725/32 |
| 2008/0127249 A1* | 5/2008 | Cruice | 725/34 |

* cited by examiner

*Primary Examiner* — Ricky Chin

(57) ABSTRACT

Systems and methods can include offering a user an incentive for viewing advertising content, delivering the advertising content to the user, monitoring the delivery of the advertising content to the user and awarding the user the offered incentive upon successful completion of delivery of the advertising content to the user. Systems and methods can further include maintaining a database of incentives awarded to the user for subsequent redemption by the user. Systems and methods can further include offering the user an opportunity to identify advertising content preferences, storing those advertising content preferences in a database and using the advertising content preferences to filter the advertising content identified to the user when the user is offered an incentive for viewing advertising content.

18 Claims, 8 Drawing Sheets

Ad Preferences

Tell Us What Kind of Products You are Interested In:

- ☐ Apparel (Clothing)
- ☐ Automobiles
- ☐ Beverages – Alcohol
- ☐ Beverages – Other
- ☐ Electronics
- ☐ Financial
- ☐ Furniture
- ☐ Health
- ☐ Jewelry
- ☐ Restaurants
- ☐ Shoes
- ☐ Travel About Ad Preferences ◁ Your Ad Preferences Help Brands Your Are Interested In:

- ☐ Apple Computer
- ☐ Best Buy
- ☐ Dell
- ☐ Gap
- ☐ Honda
- ☐ Lexus
- ☐ Macys
- ☐ Microsoft
- ☐ Sony
- ☐ Target Type of Ads You Are Interested In:

- ☐ Ads with Humor
- ☐ Ads with Music
- ☐ Ads with Celebrities
- ☐ Foreign Ads

Figure 5c

SYSTEMS AND METHODS FOR USING INCENTIVES TO INCREASE ADVERTISING EFFECTIVENESS

BACKGROUND INFORMATION

Because of credit card and retailer rewards programs, consumers have become accustomed to receiving incentives for engaging in behavior desired by the incentive provider. In those programs, the consumer typically receives an incentive for engaging in behavior consistent with interests that the consumer already possesses. The incentive simply makes the consumer more receptive to a specific brand or certain behavior.

Advertisers seek to make consumers more receptive to advertising content. Recently, advertisements have become less effective. The proliferation of advertisements in conjunction with technologies that enable consumers to avoid the advertisements contributes to this phenomenon. For example, consumers use the remote control to change channels during commercials on live television, fast forward through commercials when a show is recorded and use pop-up blockers while surfing the Internet. Even when consumers cannot avoid advertisements, they ignore those that are not relevant or interesting to them. On the other hand, advertisements can be effective when they reach consumers who are interested in the content. Advertisers would also like more granular metrics concerning which consumers are interested in particular content.

BRIEF DESCRIPTION OF THE DRAWINGS

In order to facilitate a fuller understanding of the exemplary embodiments of the present disclosure, reference is now made to the appended drawings. These drawings should not be construed as limiting, but are intended to be exemplary only.

FIGS. 5a-5g are screen shots of a graphical user interface (GUI) that can be used to identify user advertising content preferences, award incentives for viewing advertising content and provide opportunities to redeem those incentives in a video on demand (VOD) service context, according to an exemplary embodiment of the present disclosure.

DETAILED DESCRIPTION OF PREFERRED EMBODIMENTS

The following description is intended to convey a thorough understanding of the embodiments described by providing a number of specific embodiments and details involving using incentives to increase advertising effectiveness. It should be appreciated, however, that the present disclosure is not limited to these specific embodiments and details, which are exemplary only.

As used herein, the term "advertising content" will be interpreted broadly to include any type of information that a service provider or a third party may elect to send to a user. Thus, advertising content can include, but is not limited to, offers for goods or services, requests for charitable donations, requests for information, general information not associated with an offer or request, etc.

As used herein, the term "user" will be interpreted broadly to include any individual or collection of individuals, said collection of individuals incapable of being distinguished from one another from the standpoint of a service provider. A user includes, but is not limited to, an individual, a household that interacts with a service provider using a single set of identifying data, a business entity that interacts with a service provider using a single set of identifying data, etc.

The description below describes databases, servers, and other devices that may include one or more modules. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another, e.g., servers. Additionally, the modules may be moved from one device and added to another device, and/or may be included in both devices. It is further noted that any software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software and/or combinations thereof.

Figure 1:
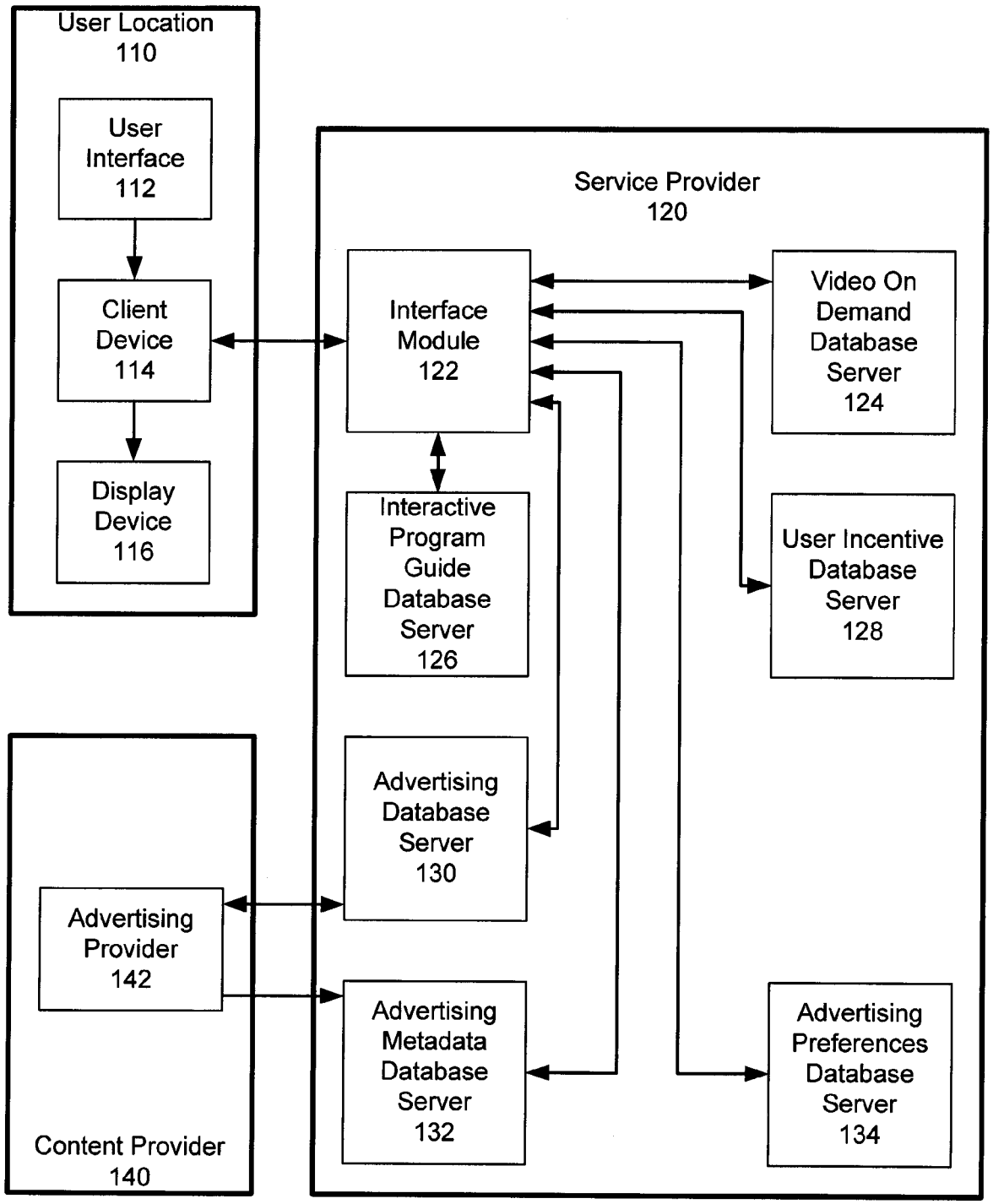
FIG. 1 is a schematic diagram of a system for rewarding users for viewing advertising content, according to an exemplary embodiment of the present disclosure.

Referring to FIG. 1, a schematic diagram of a system for rewarding users for viewing advertising content, according to an exemplary embodiment, is illustrated. System 100 is a simplified depiction of a complex system. Common modules and components of the underlying system have been omitted to limit obscuring the exemplary embodiment. The system can comprise three subsystems: a user location 110, a service provider 120 and a content provider 140.

The user location 110 can include a device for communicating user inputs to the system. The device can be a user interface 112, such as a remote control, keyboard, pointing device, e.g., a mouse, touchpad, joystick, etc., keypad, etc. The user location 110 can include a device for communicating system outputs to the user. The device can be a display device 116, such as a television, monitor, screen, etc. The user location 110 can include a device for receiving communications from the user interface 112, processing the communication from the user interface 112, sending communications to and receiving communications from the service provider 120 and outputting data to be displayed on the display device 116. The device can be a client device 114, such as a set-top box, the processing unit of a personal computer (PC), the processing unit of a cellular phone, etc. The client device 114 can include multiple components for communicating with the service provider 120, e.g., routers, modems, optical network terminators, etc., as is well known.

The user interface 112, client device 114 and display device 116 can be physically distinct components, e.g., a remote control that controls a set-top box connected to a television. The user interface 112, client device 114 and/or display device 116 can also be combined in less than three physical components, e.g., a laptop computer that incorporates a keyboard, processing unit and screen, a cellular phone with a keypad, processing unit and display screen, etc. The physical location of user location 110 can be stationary, e.g., a home or a business location. A single home or business location can contain more than one user location 110, e.g., a home with multiple televisions, each connected to a separate set-top box. The physical location of user location 110 can be mobile, e.g., a laptop computer or cellular phone that can be used in multiple locations.

A user interface 112 can be used to communicate a request to a client device 114 that the client device 114 output selected content to be displayed on a display device 116. For example, a remote control can be used to request that a set-top box output a menu for an incentive based advertising system (IBAS) to be displayed on a television. The IBAS can enable a user to view advertising content, independent of programming content, so as to be awarded an incentive, as subsequently discussed in further detail.

The service provider 120 can include one or more modules for sending communications to and receiving communications from the client device 114 and for sending communications to and receiving communications from other modules included in the service provider 120, e.g., an interface module 122. The interface module can include multiple components to enable the communication functions, e.g., wavelength division multiplexers, optical line terminals, content transmitters, servers, etc., as is well known.

The service provider 120 can include at least one database server for storing and sending content. The service provider 120 can include a database server for storing video content and sending that content for viewing on the display device 116 at a time selected by the user, e.g., a VOD database server 124. The VOD database server can contain any type of recorded content, e.g., movies, previously broadcast television episodes, previously broadcast sporting events, etc. The service provider 120 can include a database server for storing data for use in a GUI that permits the user to identify and select desired content for viewing and sending that data for viewing on the display device 116 when selected by the user, e.g., an interactive program guide (IPG) database server 126. The service provider 120 can include a database server for recording data about incentives awarded to individual users and sending that data to the interface module 122 upon request, e.g., a user incentive database server 128.

The service provider can include at least one database server for receiving content from a content provider 140, storing the content and sending the content. The service provider 120 can include a database server for receiving advertising content from at least one advertising provider 142, e.g., an advertising database server 130. The advertising database server 130 can send advertising content available for viewing on the display device 116 at a time selected by the user or a time selected by the service provider 120.

The service provider 120 can include a database server for receiving supplementary information about the advertising content, such as a description, rating, category, e.g., automobiles, etc., from at least one advertising provider 142, e.g., an advertising metadata database server 132. The advertising metadata database server 132 can send the information about the advertising content to the interface module 122 upon request. The service provider 120 can include a database server for recording user advertising content preference data and sending that data to the interface module 122 upon request, e.g., an advertising preferences database server 134.

At least one of the functions depicted as being performed by a database server can be combined with another function depicted as being performed by a separate database server in a single database server. At least one of the functions depicted as being performed by a database server can be performed by multiple database servers. Communication channels between database servers other than those depicted can exist.

It will be understood that the modules depicted in system 100 as being associated with the service provider 120 can be in one or more physical locations; multiple instances of at least one of the modules depicted in system 100 as being associated with the service provider 120 can be used; and the service provider 120 can consist of one or more legal entities. For example, a provider of cable television services can maintain at least one central location housing at least one VOD database server 124, at least one IPG database server 126, at least one advertising database server 130 and at least one advertising metadata database server 132. Subsidiaries of the cable television services provider can be located in multiple geographic regions, each subsidiary maintaining at least one separate interface module 122, user incentive database server 128 and advertising preferences database server 134.

The content provider 140 can include at least one provider of advertising content and advertising metadata, e.g., an advertising provider 142. For example, where the service provider 120 provides cable or satellite television services, the advertising provider 142 can include major corporations and/or small businesses that provide advertising content directly to the cable television provider. The advertising provider 142 can include local businesses that want to advertise only in a limited geographic region. The content provider 140 can also include at least one provider of other types of content, including programming content, video content, etc., as is well known. The content received from these providers can include advertising content in the form of linear advertisements contained in the content feed.

The user interface 112 can be used to communicate a request to the client device 114 that the client device 114 output specified content to be displayed on the display device 116, as is well known. The content can be video, audio, text, graphics, etc. and/or combinations thereof. For example, a remote control can be used to request that a set-top box display an IPG or the programming content being provided for a specified channel, e.g., channel 500, at the date and time that the channel is selected on the television. A mouse can be used to request that a personal computer (PC), display a movie from a VOD service on the monitor. A keypad can be used to request a cellular phone to display up-to-date stock prices or sports scores on the display. Any content available from a service provider 120 can be requested from any type of client device 114 for which delivery of that content to that client device 114 is supported by the service provider 120.

The client device 114 can receive the communication from the user interface 112 and can communicate a request to the interface module 122 that the interface module 122 retrieve the specified content and send the content to the client device 114. For example, when a set-top television box receives the request to display certain content, that set-top box can communicate a request to the interface module 122 to retrieve that content and send it as previously discussed.

The interface module 122 can receive the communication from the client device 114, identify the location where the requested content resides and communicate a request to the identified database server to send the requested content, as is well known. For example, the client device 114 can communicate a request to the interface module 122 for a video available from a VOD service. The interface module 122 can communicate a request to the VOD database server 124 to send the requested video. The client device 114 can communicate a request to the interface module 122 for the IPG. The interface module 122 can communicate a request to the IPG database server 126 to send the IPG. The IPG can be a GUI menu. With a GUI menu displayed on the display device 116, a request for content can be made to the client device 114 by using the user interface 112 to select that content from the menu, as is well known.

The database server can, in turn, receive the content from a content provider 140. For example, the client device 114 can communicate a request to the interface module 122 for specified advertising content. The interface module 122 can communicate a request to the advertising database server 130 to send the requested content. The advertising database server 130 can, in turn, receive the advertising content from an advertising provider 142.

The interface module 122 can receive the requested content from the identified database server and send the requested content to the client device 114. The client device 114 can receive the requested content and output the requested content to be displayed on the display device 116.

The user interface 112 can be used to communicate a request to the client device 114 that the client device 114 output an IBAS menu to be displayed on the display device 116. The data for the IBAS menu can be stored on at least one of the previously identified database servers and/or on at least one separate database server. The IBAS menu can be accessed directly or from another menu. For example, the IBAS menu can be accessed on at least one separate channel on a cable or satellite television system, e.g. channel 801. The IBAS menu can be accessed as a selection from the IPG. The IBAS menu can be accessed as a selection from the VOD menu. The IBAS menu can be accessed by pressing at least one button on the user interface 112 programmed to communicate a request to the client device 114 that the client device 114 output the IBAS menu to be displayed on the display device 116.

The IBAS menu can be a GUI menu. The IBAS menu can display a list of advertising content available for viewing on the display device 116. The list of advertising content can include a corresponding incentive for viewing the advertising content. The user interface 112 can be used to select advertising content for viewing. When advertising content is selected from the IBAS menu displayed on the display device 116, the client device 114 can communicate with the interface module 122, as previously discussed, and the interface module 122 can retrieve the advertising content from the advertising database server 130.

The advertising content in the advertising database server 130 can be provided by an advertising provider 142. The client device 114 can output the retrieved advertising content for display on the display device 116. Data can also be provided to the advertising provider 142, such as the total number of requests received for the advertising content in a selected time period. Depending on the information that the service provider 120 has available about the user and the amount of granularity desired by the advertising provider 142, the data provided to the advertising provider 142 can include categorization by factors including, but not limited to, geographic location, socioeconomic measures, gender, etc.

The advertising content can be passive, such that no opportunity is presented to the user to provide data while the content is being displayed on the display device 116. When the interface module 122 communicates passive advertising content to the client device 114, the service provider 120 can award the incentive for viewing the advertising content when the client device 114 completes the output of the advertising content to be displayed on the display device 116. For example, a remote control can be used to display the IBAS menu on a television connected to a set-top box. The set-top box can receive a request for an advertisement with an associated incentive for viewing the advertisement. The cable or satellite television service provider can award the incentive when the set-top box completes the output of the advertisement for display on the television.

The advertising content can be interactive, such that the user is presented with at least one opportunity to enter data using the user interface 112 while the advertising content is being displayed on the display device 116. When the interface module 122 sends interactive advertising content to the client device 114, the service provider 120 can award the incentive for viewing the advertising content when the client device 114 completes the output of the advertising content to be displayed on the display device 116 or when the client device 114 processes data entered by the user using the user interface 112. For example, a set-top box can receive a request from a remote control to output the IBAS menu on a television. The set-top box can then receive a request to output an advertisement with an associated incentive for viewing. At some point in the advertisement, e.g., at the end of the advertisement, the advertisement can contain an instruction to press at least one button on the remote control, e.g., the "Enter" button, within a specified period of time, e.g., ten (10) seconds, to be awarded the incentive. The set-top box can receive and process the input from the remote control. This type of interactivity can be used in an attempt to ensure that the user views the advertisement before being awarded the incentive. This type of interactivity can be used multiple times in a single advertisement. For example, an instruction can be included at the beginning of the advertisement instructing the user to press at least one button on the remote control, e.g., the "Enter" button, several times during the advertisement, e.g., at least once every ten seconds, to be awarded the incentive. The set-top box can receive and process each input from the remote control.

Interactive advertising content can be used to gather information about the user as well as attempt to ensure that the user views the advertisement before being awarded the incentive. For example, a remote control can be used to request that a set-top box output the IBAS menu on a television. The remote control can then be used to request an advertisement, e.g., an advertisement for Ford™ vehicles, with an associated incentive for viewing. The Ford™ advertisement can begin with a menu of price ranges on the television and direct the user to select a price range corresponding to the amount of money that she intends to spend on her next automobile. When the user selects a price range, the set-top box can communicate the selection to the interface module 122. The interface module 122 can communicate the selection to the advertising database server 130 to request advertising content for a Ford™ vehicle in that price range. The advertising database server 130 can send the requested advertising content to the interface module 122 for communication to the user. The advertising database server 130 can also record the user input along with selected data known about the user. The user can have multiple other opportunities to interact with the advertising content in a similar manner, each interaction being recorded in the advertising database server 130.

Data stored in the advertising database server 130 can be processed and delivered to the advertising provider 142. For example, in addition to providing Ford data on the number of requests received for the advertising content in a selected time period, and other data, as previously described, the service provider 120 can provide Ford™ with data on the price ranges or vehicles selected as well as the other selections made during the advertisement. At the completion of the advertisement, the set-top box can output a message for display on the television giving the user a choice between repeating the advertisement or ending the advertisement. When the user elects to end the advertisement, the set-top box can process that selection and send a request to the interface module 122 to award the incentive.

The incentive awarded for viewing advertising content can be constant for all advertising content, regardless of the advertising content viewed. The incentive awarded for viewing advertising content can vary depending on the advertising content viewed. For example, the IBAS can include advertisements of varying lengths, e.g., one-minute advertisements, two-minute advertisements, ten-minute advertisements, thirty-minute advertisements, etc. The incentive awarded for viewing an advertisement of longer duration can be greater that the incentive awarded for viewing an advertisement of shorter duration. The incentive associated with a given advertisement can be associated with the advertising content in the advertising metadata database server 132 and retrieved from the advertising metadata database server 132 when the client device 114 communicates a request to the interface module 122 to award the incentive. The incentive awarded for viewing the advertising content can be for a specified item, e.g., a ring tone for a cellular phone, a song download from a music database, etc., an advertising incentive credit that can be accumulated and combined with other advertising incentive credits to be redeemed for an item, e.g., a free video from a VOD service, a free month of premium content from a cable or satellite television service, etc., or any other type of incentive.

The incentive can be provided to the user at the time that the incentive is awarded. For example, a remote control can be used to display the IBAS menu on a television connected to a set-top box. The remote control can then be used to select an advertisement that offers a specified incentive, e.g., a free song download from a music download service, for viewing the advertisement on the television. When the interface module 122 sends the requested data to the set-top box, the data can contain the advertisement and instructions to be communicated to the user at the end of the advertisement. When the set-top box completes the output of the advertisement for display on the television, the set-top box can output the instructions for receiving the incentive for display on the television. The instructions can include a website for the music download service and an alphanumeric code necessary to redeem the free song download. The interface module 122 can send other instructions for redeeming other types of incentives.

Instead of being provided to the user, the incentive can be stored in an advertising incentive account in a user incentive database server 128 at the time that the incentive is awarded. When the client device 114 communicates a request to the interface module 122 to award an incentive, the interface module 122 can communicate a request to the user incentive database server 128 to record the incentive in an advertising incentive account in the user incentive database server 128. For example, a remote control can be used to request that a set-top box output the IBAS menu to a television. The remote control can then be used to select an advertisement that offers an incentive for viewing the advertisement on the television. The incentive can be a specified item, e.g. a ring tone for a cellular phone, some number of advertising incentive credits, e.g., one advertising incentive credit, or some combination thereof e.g., a ring tone for a cellular phone and 0.5 advertising incentive credits. When the set-top box finishes outputting the advertisement for display on the television, the set-top box can communicate a request to the interface module 122 to award the incentive. The interface module 122 can identify the appropriate incentive to award for viewing the advertisement by sending a request to the advertising metadata database server 132. The interface module 122 can send a request to record the incentive in an advertising incentive account in the user incentive database server 128.

An advertising incentive account in the user incentive database server 128 can be associated with at least one device, e.g., a set-top box, a cellular phone, a PC, etc., at least one individual, or combinations thereof. An advertising incentive account can be associated with a user account with the service provider 120. For example, a household can have a single advertising incentive account even though the household has more than one user or user location 110. If the service provider 120 provides multiple services to the household, e.g., cable or satellite television service, cellular phone service, Internet access service, etc., a separate advertising incentive account can be associated with each service, or an advertising incentive account can be associated with combinations of more than one service. For example, a service provider 120 that provides a household with cable television service and cellular phone service for four separate cellular phones can associate a single advertising incentive account with the incentives awarded on the set-top cable box or boxes and each of the cellular phones. An advertising incentive account can be associated with a user location 110. For example, an advertising incentive account can be associated with each set-top box in a household that has multiple set-top boxes on the same user account. A service provider 120 that provides a household with cable television service and cellular phone service for four separate cellular phones can associate a separate advertising incentive account with the incentives awarded on each set-top cable box and each cellular phone. An advertising incentive account can be associated with an individual. For example, each individual in a household can select or be assigned a unique alphanumeric code to enter when using the IBAS such that any incentive awarded is recorded to an advertising incentive account associated with that individual. The individual can use the same alphanumeric code when using the IBAS on a set-top cable box and on a cellular phone to have the incentives awarded at both user locations recorded in a single advertising incentive account. Other combinations of accounts can be possible.

Regardless of whether the advertising incentive account is associated with at least one device, at least one individual or a combination thereof, the service provider 120 can enable incentives to be transferred from at least one advertising incentive account to at least one other advertising incentive account. For example, a user associated with an advertising incentive account can send a ring tone for a cellular phone stored in the advertising incentive account to an advertising incentive account associated with a separate user. In exchange, the second user can send some number of user incentive credits stored in the second advertising incentive account to the advertising incentive account associated with the first user.

The user interface 112 can be used to request that the client device 114 output the balance of incentives in an advertising incentive account to be displayed on the display device 116. The client device 114 can communicate the request to the interface module 122. The interface module can communicate the request to the user incentive database server 128 and send the retrieved information to the client device 114 for display on the display device 116. When the user redeems an incentive, the interface module 122 can communicate a request to the user incentive database server 128 to verify that the user has sufficient and proper credits to redeem the incentive. The interface module 122 can then send the requested incentive to the client device 114 and send a request to the user incentive database server 128 to debit the advertising incentive account by the appropriate amount.

Users who view advertising content can tend to retain more of the content if the content is relevant and/or interesting to them. A GUI menu can also be set up to obtain the user's advertising content preferences so as to filter the advertisements displayed on the IBAS menu. The advertising content preferences menu can be a separate menu, a submenu of the IBAS menu or a submenu of another menu. The advertising content preferences menu can display various categories of advertisements on the display device 116 from which the user can select preferences with the user interface 112. The GUI menu can allow the user to select advertisement preferences by product type, e.g., apparel, automobiles, electronics, etc., brand, e.g., Apple™, Dell™, Gap™, Ford™, etc., advertisement genre, e.g., humorous, musical, action, etc., advertisement rating, e.g., suitable for all ages, adult only, etc. and/or any other category for which information is available from the advertising metadata database server 132. See, for example, the exemplary GUI advertising content preference menu provided in FIG. 5c. The client device 114 can communicate the user's selections through the interface module 122 as previously discussed to be stored in the advertising preferences database 134.

When the IBAS menu is subsequently requested, the interface module 122 can retrieve the advertising content preferences for the user from the advertising preferences database server 134. The interface module 122 can then filter the list of advertising content displayed on the IBAS menu to include only those advertisements that meet one or more of the selected advertising content preferences. An option can also be available on the IBAS menu to bypass the advertising content preferences setting and view all advertising content available.

As with the advertising incentive account in the user incentive database server 128, the selections in the advertising preferences database server 134 can be associated with at least one device, at least one individual, or combinations thereof. For example, an entire household can have a single set of advertising content preferences for the cable or satellite television service to the household. Each individual in the household can have a separate set of advertising content preferences. An individual in the household can have one set of advertising content preferences for use with the cable or satellite television service and a separate set of advertising content preferences for use with the cellular telephone service. Alternatively, the individual can have the same set of advertising content preferences when using cable or satellite television service, cellular phone service, Internet service and/or other services provided by the same service provider 120.

Figure 2:
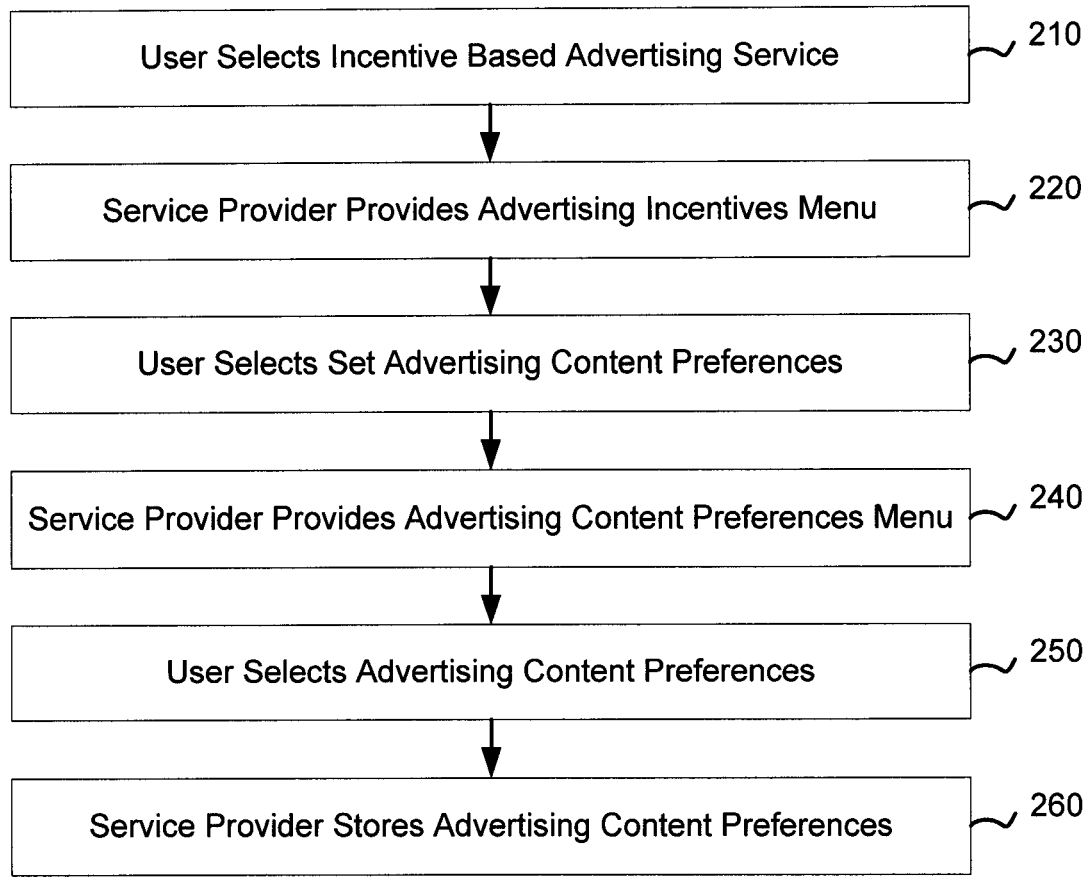
FIG. 2 is a flow chart of a method for identifying user advertising content preferences, according to an exemplary embodiment of the present disclosure.

Referring to FIG. 2, a flow chart of a method for identifying user advertising content preferences, according to an exemplary embodiment, is illustrated. In block 210, the user can use the user interface 112 to request that the client device 114 to output the IBAS menu to be displayed on the display device 116. The request can take a number of forms depending on the service being accessed from the service provider 120 and the program implementation. For example, a remote control can be used to request that a set-top box output the IBAS menu for display on a television by pressing at least one button on the remote control, e.g., by selecting the IBAS menu from a GUI menu displayed on the television, by pressing a button dedicated to the IBAS menu on the remote control, by selecting a specified channel on the cable or satellite television service, etc. A keypad on a cellular phone can be used to request that the cellular phone output the IBAS menu for display on the cellular phone display by pressing at least one key on the keypad, e.g., by dialing a specified access number. A keyboard or mouse used with a PC can be used to request that the PC output the IBAS menu for display on a monitor by pressing at least one key on the keyboard or mouse, e.g., by typing a specified uniform resource locator (URL) in a browser running on the PC or selecting a link on a website, to access the website where the IBAS menu is located. Method 200 then proceeds to block 220.

Figure 5A:
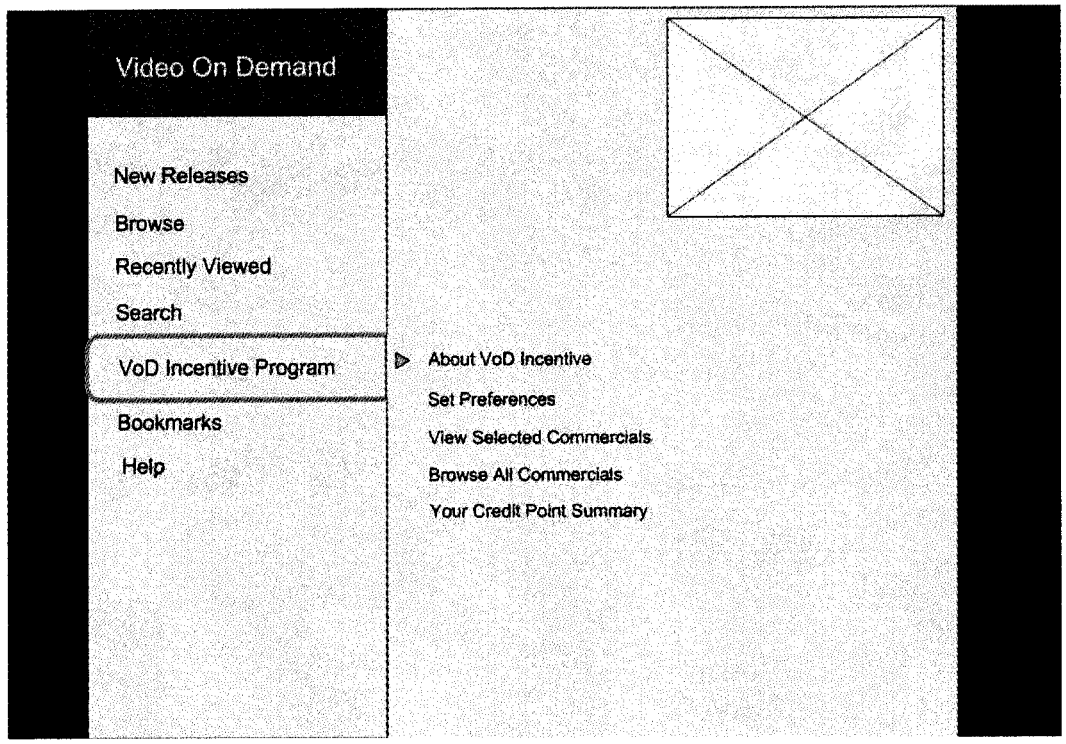

In block 220, the service provider 120 can provide the user with a menu of options available under the IBAS menu. The IBAS menu can be implemented as a top-level menu or as a sublevel menu. For example, the IBAS menu can be a sublevel menu to the main menu for the VOD service. The advertising content preferences menu can be a submenu to the IBAS menu. FIGS. 5a and 5c depict sample screen shots of an exemplary embodiment wherein the IBAS menu can be a submenu of a VOD service, and the advertising incentive menu can be a submenu of the IBAS menu respectively. In this exemplary embodiment, when the user interface 112 is used to request that the client device 114 output the VOD service menu to be displayed on the display device 116, the GUI menu shown in FIG. 5a can be displayed. The user interface 112 can then be used to select "VOD Incentive Program" from the list of options available to cause the IBAS menu to be displayed on the display device 116.

Returning to FIG. 2, an option available on the IBAS menu can be "Set Advertising Preferences" or a similar option. For example, in the exemplary embodiment where the IBAS can be implemented as part of the VOD service, the IBAS menu can include the "Set Preferences" option shown in FIG. 5a. Method 200 then proceeds to block 230.

In block 230, the user interface 112 can be used to select, from the menu provided, the option to set advertising content preferences. For example, in the exemplary embodiment where the IBAS can be implemented as part of the VOD service, the user interface 112 can be used to select the "Set Preferences" option from the GUI menu depicted in FIG. 5a. Method 200 then proceeds to block 240.

In block 240, the service provider 120 can provide the user with a menu of options for selecting advertising content preferences. For example, the service provider 120 can cause the client device 114 to output a GUI for display on the display device 116 from which the user interface 112 can be used to select advertising content preferences. The menu of options provided to the user in block 240 can consist of a master menu containing at least two submenus. For example, the user can be given the option to set separate advertising content preferences for at least two viewing platforms, e.g., television, cellular phone, PC, etc. Selection of one of the viewing platforms can result in a submenu of options for selecting advertising content preferences on that viewing platform.

The advertising content preferences menu can categorize advertising content by at least one attribute. For example, in the exemplary embodiment where the IBAS can be implemented as a submenu of the VOD services menu, FIG. 5c can depict a sample screen shot of the advertising content preferences GUI displayed on the display device 116. The client device 114 can output categories of products, e.g., apparel, to be displayed. The client device 114 can output product brands, e.g., Apple™ Computer, to be displayed. The client device 114 can output advertisement genres, e.g., advertisements with humor, to be displayed. The client device 114 can output attributes in addition to and/or other than at least one of the attributes depicted in FIG. 5c to be displayed, such as advertisement ratings, e.g., suitable for all ages, advertisement durations, e.g., sixty seconds or less, etc. The advertising content preferences menu can include options in addition to advertising attributes. For example, advertising attributes can be separated by day of the week, e.g., Monday through Friday, and/or time of day, e.g., morning, afternoon, evening, to capture different viewing patterns or viewers in the household. Method 200 then proceeds to block 250.

In block 250, the user interface 112 can be used to select advertising content preferences. More than one selection can be made for each advertising attribute, or no selection can be made for an attribute. For example, for the advertising content preferences menu depicted in FIG. 5c, the user interface 112 can be used to select "Apparel," "Financial" and "Shoes," from the "Kind of Products" attributes, while leaving the "Brands" and "Type of Ads" attributes blank (or, depending on the way that the filtering process functions, selecting all of the selections in the "Brands" and "Type of Ads" attributes) so as to see all of the available apparel, financial and shoes advertisements. In another example, the user interface 112 can be used to select "Dell" and/or "Ads with Music" so as to see all of the available Dell™ advertisements and/or advertisements containing music available. Once a selection(s) has been made, the user interface 112 can be used to direct the client device 114 to save the advertising content preferences. Method 200 then proceeds to block 260.

In block 260, the service provider 120 can store the advertising content preferences in an account in a database server, e.g., an advertising preferences database server 134. Accounts in an advertising preferences database server 134 can be associated with at least one device, at least one individual, or combinations thereof. For example, the advertising content preferences menu can permit the user to input and store an alphanumeric code associated with the selected advertising content preferences so as to be able to recall advertising content associated with that advertising content preferences selection at a later time. If the household has multiple set-top boxes, cellular phones or personal computers that the system of the service provider 120 can distinguish as separate units, the advertising content preferences can be associated with a particular device. Other groupings can be possible.

Figure 3:
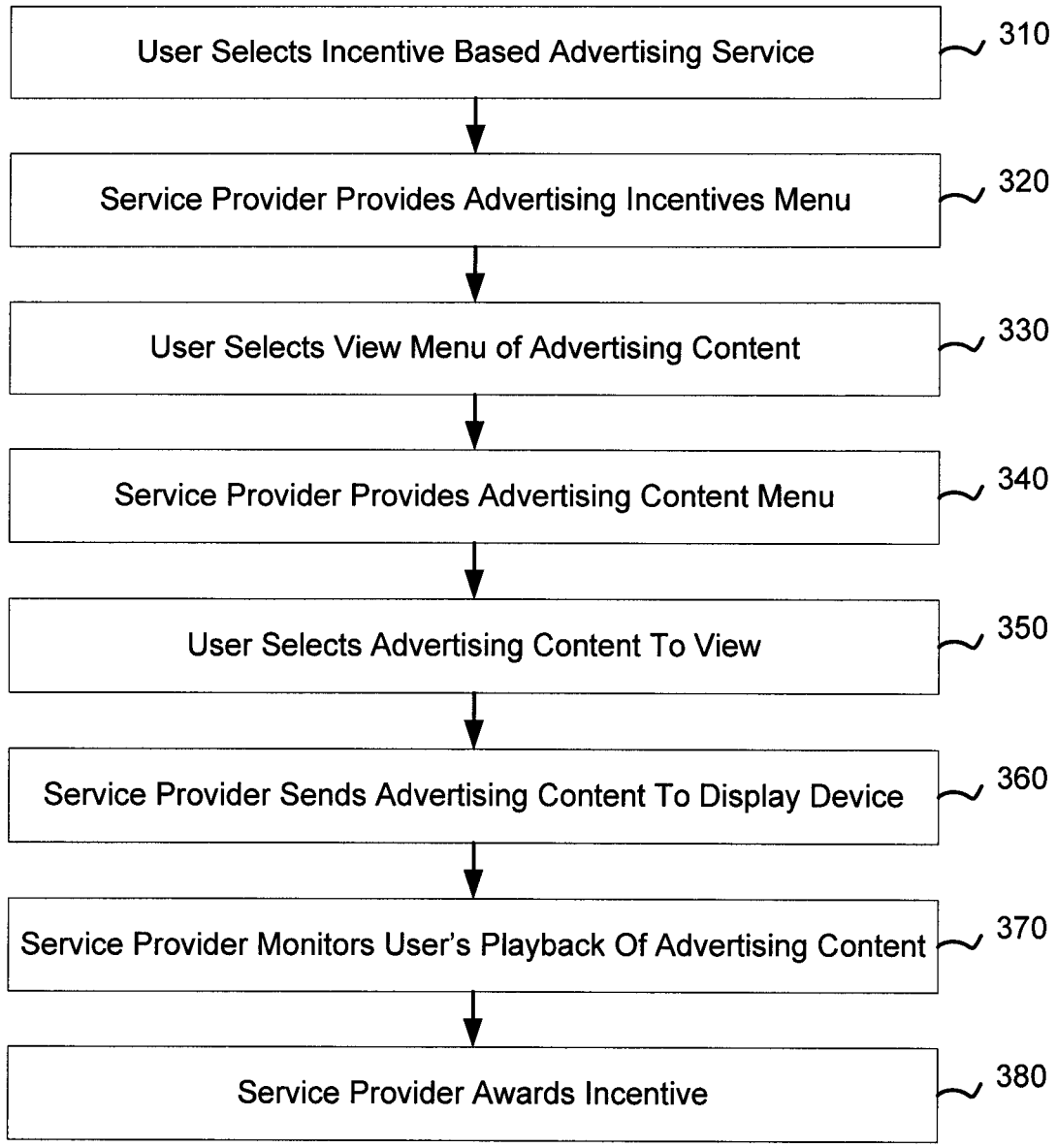
FIG. 3 is a flow chart of a method for awarding the user an incentive for viewing advertising content, according to an exemplary embodiment of the present disclosure.

Referring to FIG. 3, a flow chart of a method for awarding the user an incentive for viewing advertising content, according to an exemplary embodiment, is illustrated. In block 310, the user can use the user interface 112 to request that the client device 114 output the IBAS menu to be displayed on the display device 116. The request can take a number of forms depending on the service being accessed from the service provider 120 and the program implementation as detailed in the discussion of block 210 in method 200. Method 300 then proceeds to block 320.

Figure 5B:
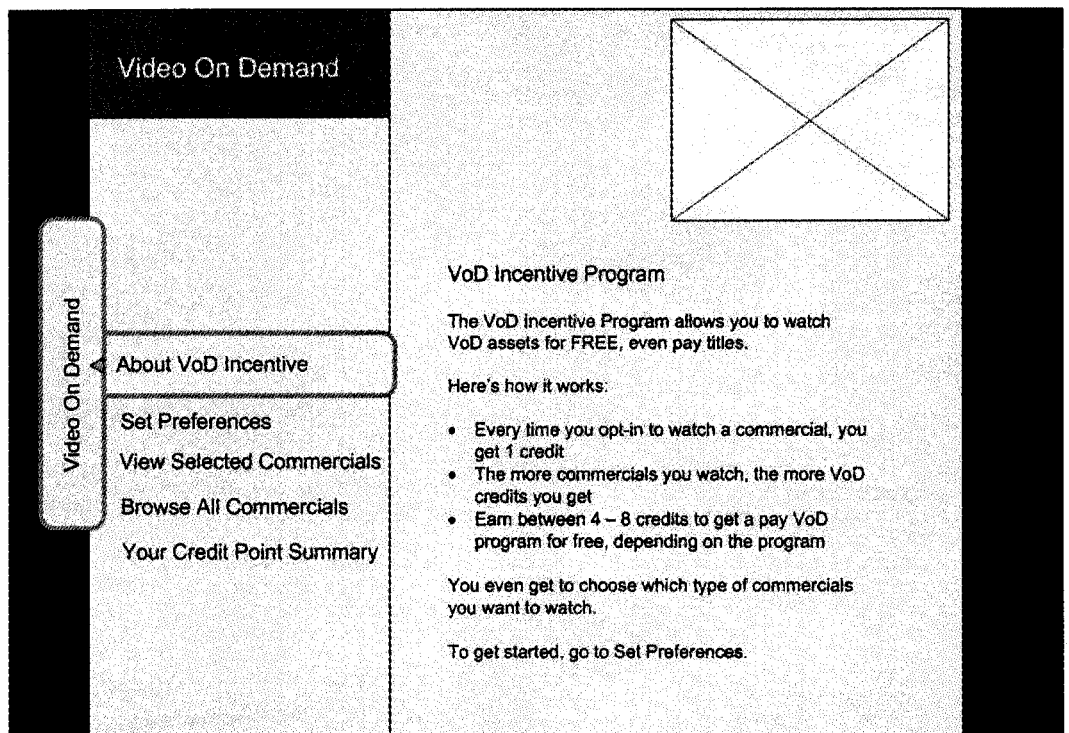

In block 320, the service provider 120 can provide the user with a menu of options available under the IBAS menu. The IBAS menu can be implemented as a top-level menu or as a sublevel menu. For example, the IBAS menu can be a sublevel menu to the main menu for the VOD service. The advertisement selection menu can be a submenu to the IBAS menu. FIGS. 5a, 5b, 5d and 5e depict sample screen shots of an exemplary embodiment wherein the IBAS menu can be a submenu of a VOD service, and the advertisement selection menu can be a submenu of the IBAS menu respectively. In this exemplary embodiment, when the user interface 112 is used to request that the client device 114 output the VOD service to be displayed on the display device 116, the GUI menu shown in FIG. 5a can be displayed. The user interface 112 can then be used to select "VOD Incentive Program" from the list of options available. The user interface 112 can then be used to select "About VOD Incentive" to learn more about the IBAS as depicted in FIG. 5b.

Returning to FIG. 3, an option available on the IBAS menu can be "List Advertisements" or a similar selection. For example, in the exemplary embodiment where the IBAS can be implemented as part of the VOD service, the IBAS menu can include the "View Selected Commercials" and "Browse All Commercials" options shown in FIG. 5b. Method 300 then proceeds to block 330.

In block 330, the user interface 112 can be used to select, from the menu provided, a menu of advertising content available for viewing. For example, in the exemplary embodiment where the IBAS can be implemented as part of the VOD service, the user interface 112 can be used to select the "View Selected Commercials" or the "Browse All Commercials" option from the GUI menu depicted in FIG. 5b. Method 300 then proceeds to block 340.

In block 340, the service provider 120 can provide the user with a menu of advertising content available for viewing from a database server, e.g., an advertising database server 130. If the IBAS employs variable incentives, the advertising content in the advertising database server 130 can be associated with an available incentive for each advertisement. The available incentive can be stored with other information about the advertising content in a database server, e.g., the advertising metadata database server 132. The available incentive can be listed with the advertising content in the menu provided to the user. Alternatively, the incentive for viewing advertising content can be a constant, in which case a menu of only advertising content can be provided.

If the IBAS does not employ user advertising content preferences, the user has not set any advertising content preferences, or the user elects to browse all available advertising content, the interface module 122 can retrieve a list of all available advertising content from the advertising database server 130 for inclusion in the menu provided to the user. For example, in the exemplary embodiment where the IBAS can be implemented as part of the VOD service, a remote control can be used to select the "Browse All Commercials" choice shown in FIG. 5b. The interface module 122 can send a menu of advertising content grouped by attributes to a set-top box to output for display on a television as depicted in FIG. 5c. The remote control can then be used to select an attribute to see a submenu of advertising content consistent with that attribute. The remote control can be used to select an advertisement for viewing from the submenu. Alternatively, the interface module 122 can send a menu of all available advertising content without the master menu of attributes.

Figure 5D:
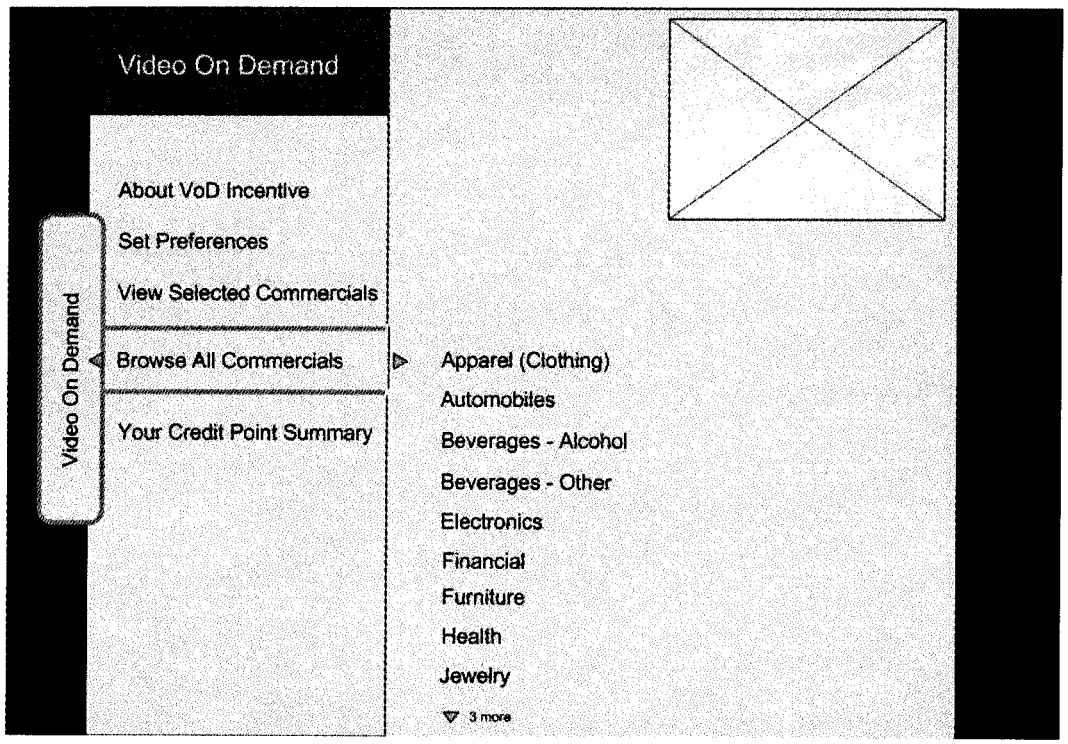
Figure 5E:
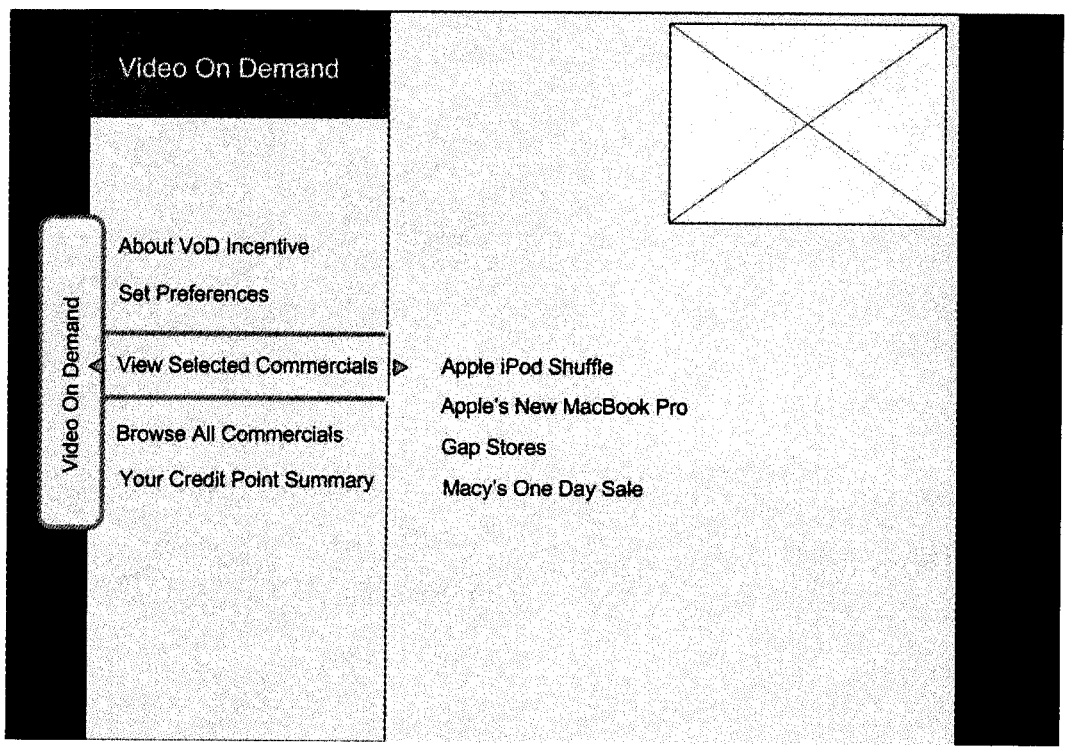

If the IBAS employs user advertising content preferences, the attributes used in the advertising preferences database server 134 can be consistent with the advertising information stored in the advertising metadata database server 132. If the user has set advertising content preferences and elects to view only advertising content that satisfies those preferences, the interface module 122 can retrieve the user advertising content preferences from the advertising preferences database server 134. The interface module 122 can then select for inclusion in the menu provided to the user only advertising content from the advertising database server 130 that satisfies those user advertising content preferences by comparing the advertising content preferences to the information about the advertising content stored in the advertising metadata database server 132. For example, in the exemplary embodiment where the IBAS can be implemented as part of the VOD service, and the remote control is used to select the "View Selected Commercials" option depicted in FIG. 5b, the interface module 122 can send a menu of advertising content that satisfies the user advertising content preferences to the set-top box to output for display on the television as shown in FIG. 5d. Once a menu of advertising content available for viewing is displayed on the display device 116, method 300 proceeds to block 350.

In block 350, the user interface 112 can be used to select advertising content available for viewing. The user can select at least one advertisement for viewing. The client device 114 can communicate the selection to the interface module 122. Method 300 then proceeds to block 360.

In block 360, the service provider 120 can send the selected advertising content to the client device 114 to output for display on the display device 116. The interface module 122 can communicate the selection to the advertising database server 130 with a request to send the selected advertising content back to the interface module 122. The interface module can then send the selected advertising content back to the client device 114 to output for display on the display device 116. Method 300 then proceeds to block 370.

In block 370, the service provider 120 can monitor how the client device 114 outputs the advertising content to be displayed on the display device 116 in an attempt to ensure that the user should be awarded the incentive. The rules for determining that a user should be awarded the incentive can vary. For example, the user can be awarded the incentive if the client device 114 outputs the entire content of the advertisement to be displayed on the display device 116. The user can be awarded the incentive if the client device 114 outputs the entire content of the advertisement to be displayed on the display device 116, and the client device 114 does not receive and process a request from the user interface 112 to fast forward the advertisement. The user can be awarded the incentive if the client device 114 outputs the entire content of the advertisement to be displayed on the display device 116, the client device 114 does not receive and process a request from the user interface 112 to fast forward the advertisement, and the client device 114 receives for processing a rating for the advertisement, e.g., zero through nine, from the user interface 112 at the end of the advertisement.

If the user interface 112 is used to input a rating for an advertisement, the client device 114 can communicate the rating to the interface module 122. The interface module 122 can communicate the rating to the advertising database server 130 to be associated with the advertisement. The service provider 120 can process the ratings input by multiple users and communicate the processed data to an advertising provider 142. The service provider 120 can also use the processed data to create a list of highest rated advertisements for use in the user preferences menu provided by the service provider 120 in block 240 of method 200.

The service provider 120 can award the incentive to the user if the client device 114 receives and processes a communication from the user interface 112 during the advertisement. For example, where the user is viewing an advertisement on a television connected to a set-top box, the advertisement can begin with a message that the incentive will only be awarded if a specified button on the remote control, e.g., "Enter" is depressed at a specified time or rate, e.g., at least once every ten seconds, during the entire advertisement. The set-top box can then monitor the inputs received from the remote control to determine if the specified button has been depressed at the specified rate.

The advertisement can be interactive such that the service provider 120 can award the user the incentive when the user interacts with the advertisement. For example, the interface module 122 can send a set-top box a selected amount of advertising content to be output for display on a television, e.g., the first thirty seconds of an advertisement for Apple™ products. At the end of the selected amount of advertising content, the set-top box can output several Apple™ products, e.g., an iPod™, a MacBook Pro™, an iMac™, etc., to be displayed on the television, instructing the user to select a product to learn more about within a given time period, e.g., ten seconds. The remote control can be used to select the iPod™. The set-top box can receive the selection and communicate the selection to the interface module 122. The interface module 122 can communicate the selection to the advertising database server 130 so as to retrieve the selected content from the advertising database server 130 and send the selected content to the set-top box. The set-top box can output the selected content about the Apple iPod™ for display on the television. At the end of the selected content about the Apple iPod™, the set-top box can output several options, e.g., end the advertisement, repeat the advertisement, purchase an Apple iPod™, etc., to be displayed on the television, instructing the user to make a selection within a given time period, e.g., ten seconds. The service provider 120 can award the incentive if the set-top box receives and processes a selection from the final set of options within the given time period, e.g., the remote control is used to select end the advertisement within ten seconds. The service provider 120 can implement other rules for determining when the user should be awarded the incentive.

The service provider 120 can award variable levels or types of incentives for specified user behavior. For example, the service provider 120 can award the user one level or type of incentive for viewing an advertisement and another level or type of incentive for interacting with the advertisement in a prescribed manner.

The service provider 120 can award the user one level or type of incentive for viewing an advertisement and an additional level or type of incentive for sending the advertisement to another user who receives service from the service provider 120. For example, a user can be awarded an advertising incentive credit for viewing an advertisement on a cellular phone. At the end of the advertisement, the user can be given an opportunity to be awarded an additional advertising incentive credit for sending the advertisement to another user of the service provider's cellular phone service. The user can send the advertisement by pressing at least one specified key on the keypad and dialing the second user's cellular phone number. The user can be awarded the additional advertising incentive credit when the advertisement is sent or when the second user views the advertisement. A similar approach can be implemented using e-mail by an Internet service provider or across platforms by associating alphanumeric codes with advertisements that can be transmitted among users. This approach can provide an infrastructure for advertisers to develop viral marketing campaigns through social networks. Method 300 then proceeds to block 380.

In block 380, the service provider 120 can record the incentive awarded to the user in a database server, e.g., a user incentive database server 128. The client device 114 can communicate to the interface module 122 the request for the service provider 120 to award the incentive. The interface module 122 can communicate a request to the user incentive database server 128 to record the incentive. If the incentive is a constant, e.g. one advertising incentive credit for each advertisement viewed, the instruction can be to increase the balance of advertising incentive credits by one. If the incentive is variable, e.g., a number of advertising incentive credits or a specified incentive, e.g., a free ring tone, the instruction can include the amount or type of incentive to record.

The service provider 120 can award an incentive to a user each time that the user views the same advertisement. For example, an incentive of one advertising incentive credit can be awarded to a user for viewing a Gap™ advertisement. A second advertising incentive credit can be awarded to the user for viewing the same Gap™ advertisement a second time. An additional advertising incentive credit can be awarded to the user each time that the advertisement is viewed. Alternatively, the service provider 120 can limit the number of times that the user can be awarded an incentive for viewing the same advertisement. The service provider 120 can associate an alphanumeric code with each advertisement that gets recorded to the user incentive database server 128. The service provider can limit the number of times that a given alphanumeric code can be recorded to an account in the user incentive database server 128.

Figure 4:
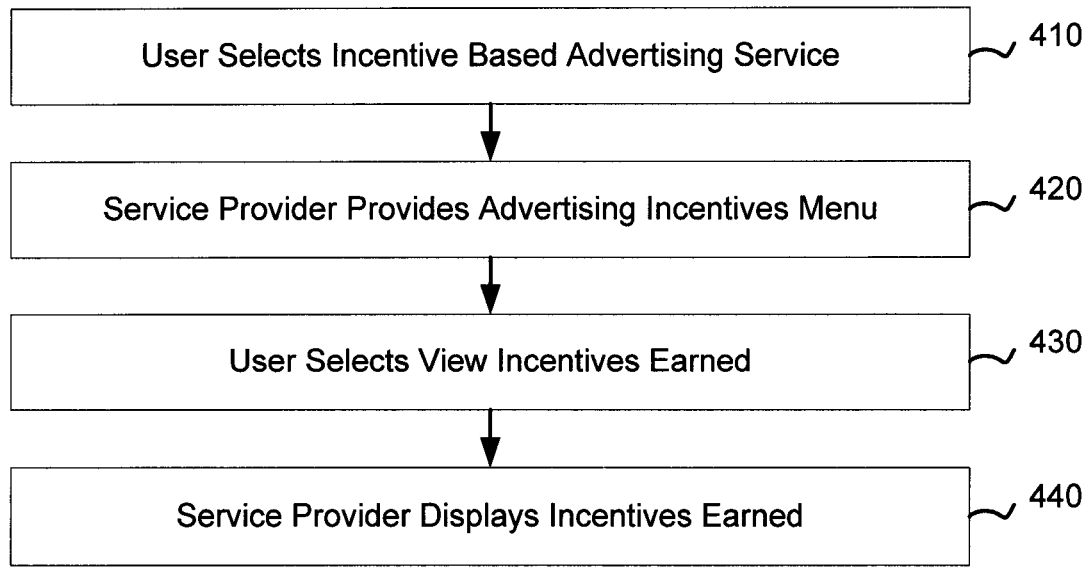
FIG. 4 is a flow chart of a method for allowing the user to view incentives awarded for viewing advertising content, according to an exemplary embodiment of the present disclosure.

Referring to FIG. 4, a flow chart of a method for allowing the user to view incentives awarded for viewing advertising content, according to an exemplary embodiment, is illustrated. In block 410, the user can use the user interface 112 to request that the client device 114 output the IBAS menu for display on the display device 116. The request can take a number of forms depending on the service being accessed from the service provider 120 and the program implementation as detailed in the discussion of block 210 in method 200. Method 400 then proceeds to block 420.

Figure 5F:
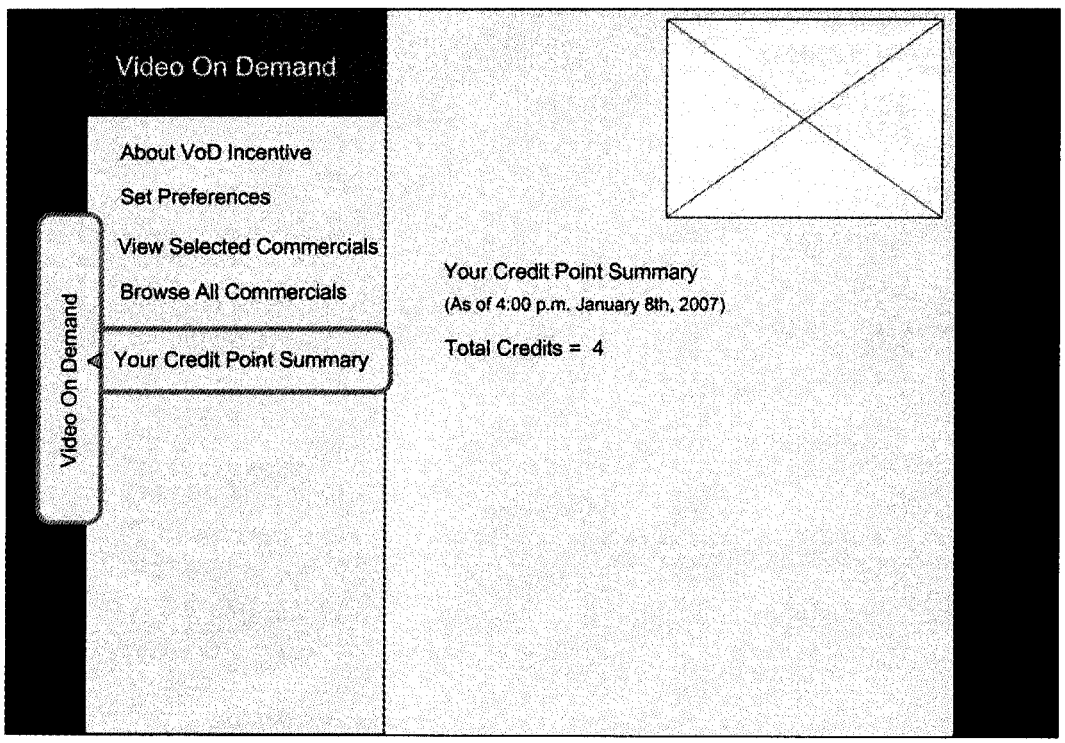

In block 420, the service provider 120 can provide the user with a menu of options available under the IBAS menu. The IBAS menu can be implemented as a top-level menu or as a sublevel menu. For example, the IBAS menu can be a sublevel menu to the main menu for the VOD service. FIGS. 5a and 5f depict sample screen shots of an exemplary embodiment wherein the IBAS menu can be a submenu of a VOD service and viewing advertising incentive credits can be a selection on the IBAS menu. In this exemplary embodiment, when the user interface 112 is used to request that the client device 114 output the VOD service to be displayed on the display device 116, the GUI menu shown in FIG. 5a can be displayed. The user interface 112 can then be used to select "VOD Incentive Program" from the list of options available.

Returning to FIG. 4, an option available on the IBAS menu can be "View Incentives Awarded" or a similar selection. For example, in the exemplary embodiment where the IBAS can be implemented as part of the VOD service, the menu can include the "Your Credit Point Summary" option shown in FIG. 5a. Method 400 then proceeds to block 430.

In block 430, the user interface 112 can be used to select a summary of the advertising incentives awarded. For example, in the exemplary embodiment where the IBAS can be implemented as part of the VOD service, the user interface 112 can be used to select the "Your Credit Point Summary" choice shown in FIG. 5a. Method 400 then proceeds to block 440.

In block 440, the service provider 120 can output the incentives awarded to the user to be displayed on the display device 116. The client device 114 can communicate a request to the interface module 122 to retrieve the incentives awarded to the user. The interface module 122 can communicate a request to the user incentive database server 128 to send the incentives awarded to the user and send the returned information to the client device 114. The client device 114 can then output the information to be displayed on the display device 116. For example, in the exemplary embodiment where the IBAS can be implemented as part of the VOD service, a remote control can be used to select "Your Credit Point Summary" from the GUI menu depicted in FIG. 5a. A set-top box can output the information depicted in FIG. 5f to be displayed on the television. The IBAS can award the user specified incentives, e.g., ring tones, music downloads, etc., instead of, or in addition to, advertising incentive credits, in which case the client device 114 can output the specified incentives awarded to be displayed as well.

Figure 5G:
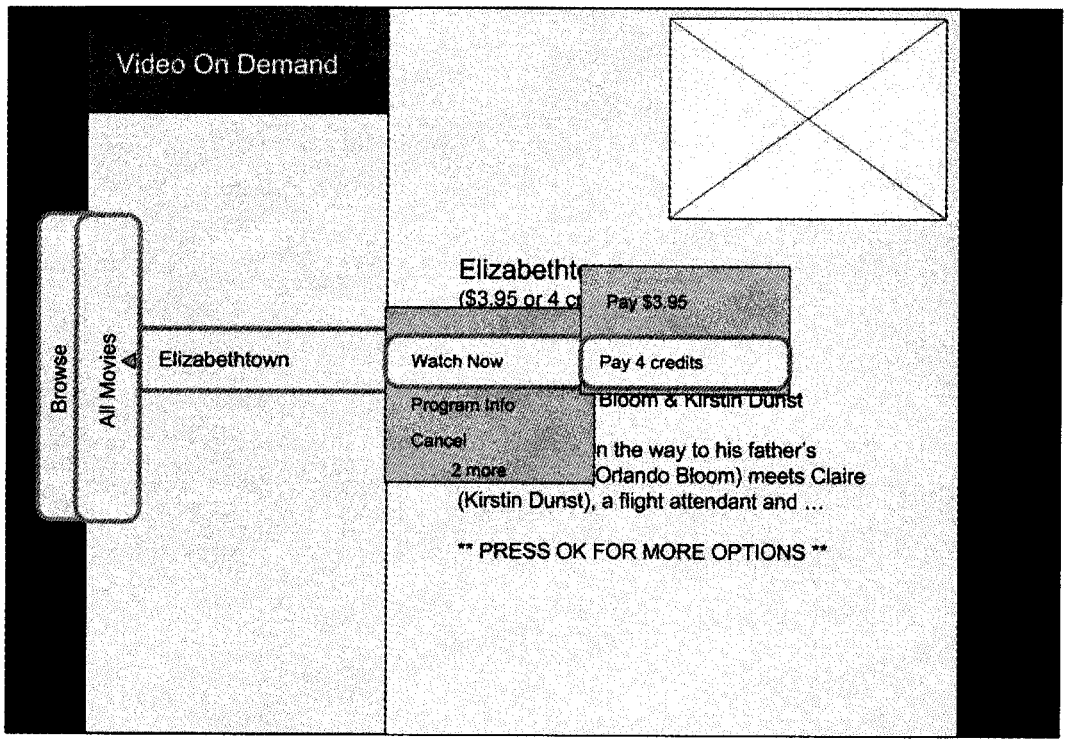

Redemption of user incentives can vary according to implementation of the IBAS. The IBAS can be integrated with a service such as the VOD service, in which case redemption can be limited to redeeming advertising incentive credits for aspects of that service. For example, the user can accumulate advertising incentive credits in the user incentive database server 128. When the user browses a menu of videos available for viewing as part of the VOD service, the menu can include both a price and a number of credits for viewing the video. Referring to FIG. 5g, when the user selects a video for viewing, the user can be given a choice of being billed the identified price or redeeming the identified number of credits. If the user elects to redeem credits, the interface module 122 can communicate a request to the user incentive database 128 to reduce the number of credits available for redemption by the number necessary to view the video. If the interface module 122 receives a communication from the user incentive database 128 that the user has sufficient credits to view the video, the interface module can retrieve the video from the VOD database server 124 and send the video to the client device 114 to output the video for display on the display device 116. If the interface module 122 receives a communication from the user incentive database 128 that the user has insufficient credits to view the video, the interface module 122 can send a message to that effect to the client device 114 to output for display on the display device 116.

The IBAS can be limited to specified incentives, in which case an incentive can be redeemed upon being awarded to the user. For example, the user can elect to view an advertisement on a cellular phone in exchange for a specified ring tone. Once the service provider 120 awards the ring tone to the user, the ring tone can be delivered to the cellular phone. Alternatively, a URL and a code that enables the user to retrieve the ring tone, song or other downloadable content can be delivered to the client device 114 to output the information to be displayed on the display device 116 once the service provider 120 awards the incentive to the user. In this exemplary embodiment, the service provider 120 can eliminate the user incentive database 128; the incentives can be associated with the advertising content in the advertising metadata database server 132.

The IBAS can include both credits that can be accumulated and specified incentives, in which case both types of incentives can be stored in a user incentive database server 128. The user interface 112 can be used to communicate a request to the client device 114 to output a menu of redemption options for display on the display device 116. For example, a menu of redemption options can be available on a specified channel on a cable or satellite television system or at a specified website that can be accessed with an IP-enabled device.

The service provider 120 can provide a menu of products and services available for redemption along with the number of credits necessary to acquire them in conjunction with the display of incentives awarded to the user in block 440 of method 400. The menu can include only those items that the user has sufficient credits to acquire. The menu can include all available items with those items that the user has sufficient credits to acquire highlighted. By selecting from the menu, the user can be transferred to the service requested or receive a code necessary to access the service requested on another platform.

System 100 depicted in FIG. 1 and a majority of the examples associated with the description of the systems and methods focus on using incentives to increase advertising effectiveness in the context of a cable or satellite television system. The system 100 schematic can also represent implementation on a cellular phone system, an Internet service system and/or a similar system with the representations at the user location 110 and the representation of the interface module 122 representing the modules necessary to effect communication between a client device 114 and an interface module 122 in those systems, as is well known.

In the context of a cellular phone system, a user interface 112, e.g., the keypad of a cellular phone, can be used to communicate a request to the client device 114, e.g., the processor of a cellular phone, to output the IBAS GUI menu for display on a display device, e.g., the cellular phone display. The request can be communicated to the cellular phone processor by pressing at least one button on the cellular phone keypad. For example, the IBAS GUI menu can be requested by dialing a specified access number. The cellular phone processor can communicate the request to an interface module 122 over a cellular network, as is well known. The interface module 122 can retrieve the IBAS GUI menu and send it to be displayed on the cellular phone screen as previously described. The cellular phone keypad can be used to request the content previously described, including menus and options available as part of the IBAS as well as the advertising content to be viewed.

In the context of an Internet service system, the system can be accessed by any IP-enabled device, e.g., a PC, a personal digital assistant (PDA), a smart phone, an IP-enabled cellular phone or any similar device. For a PC, a user interface, e.g., a keyboard, mouse, etc., can be used to communicate a request to the client device 114, e.g., the PC processor, to output the IBAS GUI for display on a display device, e.g., the PC monitor. The request can be communicated to the processor by pressing at least one button on the keyboard. For example, the IBAS GUI menu can be requested by inputting a URL in a browser running on the PC. The processor can communicate the request to an interface module 122 over an IP-based network, as is well known. The interface module 122 can retrieve the IBAS GUI menu and send it to be displayed on the PC monitor as previously described. The keyboard and/or mouse can be used to request the content previously described, including menus and options available as part of the IBAS as well as the advertising content to be viewed.

Because of the differences in capability between viewing platforms, implementation on a cellular phone system, an Internet service system and/or a similar system can vary in the level of complexity in the IBAS, the types of advertising content available, etc. For example, cellular phones and some IP-enable devices such as PDAs, smart phones, etc., have a significantly smaller and less capable display than televisions. Accordingly, the IBAS menus can be shortened and simplified in recognition of this fact. Similarly, the advertising content offered on those devices can be less visually detailed.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method comprising:
receiving, from a user, a first plurality of advertising content preferences associated with a first type of viewing platform and a second plurality of advertising content preferences associated with a second type of viewing platform, wherein the first plurality of advertising content preferences comprise at least one of: product category, product brand, advertisement genre, advertisement age ratings and advertisement duration, and wherein the second plurality of advertising content preferences comprise at least one of: product category, product brand, advertisement genre, advertisement age ratings and advertisement duration;
filtering a plurality of advertising content programs using at least one of the first plurality of advertising content preferences and the second plurality of advertising content preferences based on a type of viewing platform associated with a display device;
outputting, to the display device for display, a menu of one or more of the plurality of advertising content programs based on the filtering, wherein each advertising content program is outputted with an incentive for viewing the corresponding advertising content program, wherein the incentive is a variable incentive;
receiving at least one input, sent by the user via a user interface, corresponding to a selection of an advertising content program from the menu;
outputting, to the display device for display, the selected advertising content program;
monitoring the viewing of the selected advertising content program, wherein monitoring the viewing of the advertising content program further comprises receiving at least one input, sent by the user via the user interface, in response to at least one prompt associated with the advertising content program, wherein the at least one input comprises at least one of rating the advertisement content program and sharing the advertisement content program;
determining an incentive value for the variable incentive based on the received at least one input;
outputting, to the display device for display, information comprising instructions to redeem the incentive value associated with the selected advertising content program;
determining that the instructions to redeem the incentive value have been followed; and
awarding the incentive value to the user for viewing the selected advertising content program by storing the incentive value in an advertising incentive account that is accessible to the user, wherein the advertising incentive account accumulates incentive values and wherein the accumulated incentive values may be redeemed in exchange for video content.

2. The method of claim 1 wherein outputting the advertising content program further comprises retrieving the advertising content program from at least one database.

3. The method of claim 1 further comprising storing the at least one advertising content preference in at least one database.

4. The method of claim 1 wherein awarding the incentive value to the user further comprises awarding credit to the user.

5. The method of claim 4 further comprising exchanging credit awarded to the user for at least one of a product and service.

6. The method of claim 4 further comprising storing credit awarded to the user in at least one database.

7. The method of claim 6 further comprising:
exchanging credit stored in the at least one database for at least one of a product and service; and
reducing the credit stored in the at least one database by the credit exchanged.

8. The method of claim 6 further comprising outputting, to the display device for display, a summary of the credit stored in the at least one database.

9. The method of claim 1 wherein the first type of viewing platform comprises a television viewing platform.

10. The method of claim 1 wherein the second type of viewing platform comprises a cellular telephone viewing platform.

11. The method of claim 1 wherein the accumulated incentive values are used by the user to purchase video-on-demand programming.

12. The method of claim 1, wherein determining the incentive value for the variable incentive is further based on at least one of: an output amount of the selected advertising content program; whether a fast-forward request was made with respect to the selected advertising content; and whether a specific predetermined input is received during the selected advertising content.

13. A system comprising:
a first database comprising a first plurality of advertising content preferences associated with a first type of viewing platform received from a user and a second plurality of advertising content preferences associated with a second type of viewing platform received from the user, wherein the first plurality of advertising content preferences comprise at least one of: product category, product brand, advertisement genre, advertisement age ratings and advertisement duration, and wherein the second plurality of advertising content preferences comprise at least one of: product category, product brand, advertisement genre, advertisement age ratings and advertisement duration;
a second database comprising a plurality of advertising content programs, wherein each advertising content program is associated with an incentive for viewing the corresponding advertising content program, wherein the incentive is a variable incentive;
a third database for storing incentive values awarded to the user; and
a module comprising:
a processor to filter the plurality of advertising content programs using at least one of the first plurality of advertising content preferences and the second plurality of advertising content preferences based on a type of viewing platform associated with a display device;
an output to output, to the display device for display, a displayed menu of one or more of the plurality of advertising content programs based on the filtering;
a receiver to receive a selection of an advertising content program corresponding to an option on the displayed menu of the one or more of the plurality advertising content programs;
a processor to process the selection of the advertising content program;
an output to output the selected advertising content program to the display device for display;
a processor for monitoring the display of the advertising content program on the display device, wherein monitoring the display of the advertising content program further comprises receiving at least one input, sent by the user via a user interface, in response to at least one prompt associated with the advertising content program, wherein the at least one input comprises at least one of rating the advertisement content program and sharing the advertisement content program;
a processor for determining an incentive value for the variable incentive based on the received at least one input;
an output to output information comprising instructions to redeem the incentive value associated with the advertising content program;
a processor for determining that the instructions to redeem the incentive value have been followed; and
a processor to update the third database for storing incentive values awarded to the user after the selected advertising content is displayed and the incentive value is awarded to the user and store the incentive value in an advertising incentive account that is accessible to the user, wherein the advertising incentive account accumulates incentive values and wherein the accumulated incentive values may be redeemed in exchange for video content.

14. The system of claim 13 wherein the receiver receives the selection of the advertising content program from a user interface.

15. The system of claim 13 further comprising a second module for retrieving the selected advertising content program from the second database and sending the selected advertising content program to the first module to output the selected advertising content program to the display device for display.

16. The system of claim 13 wherein the displayed menu of the plurality of advertising content programs further comprises a graphical user interface.

17. The system of claim 13 wherein the first type of viewing platform comprises a television viewing platform.

18. The system of claim 13 wherein the second type of viewing platform comprises a cellular telephone viewing platform.

* * * * *